US009813202B2

(12) United States Patent
Lindoff et al.

(10) Patent No.: US 9,813,202 B2
(45) Date of Patent: Nov. 7, 2017

(54) INTERFERENCE CANCELLATION IN WIRELESS NETWORKS

(71) Applicants: Bengt Lindoff, Bjarred (SE); Niklas Andgart, Sodra Sandby (SE); Fredrik Nordstrom, Lund (SE)

(72) Inventors: Bengt Lindoff, Bjarred (SE); Niklas Andgart, Sodra Sandby (SE); Fredrik Nordstrom, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 381 days.

(21) Appl. No.: 14/405,706

(22) PCT Filed: Sep. 28, 2012

(86) PCT No.: PCT/EP2012/069242
§ 371 (c)(1),
(2) Date: Dec. 4, 2014

(87) PCT Pub. No.: WO2013/185854
PCT Pub. Date: Dec. 19, 2013

(65) Prior Publication Data
US 2015/0146679 A1 May 28, 2015

Related U.S. Application Data

(60) Provisional application No. 61/659,745, filed on Jun. 14, 2012.

(51) Int. Cl.
*H04B 1/04* (2006.01)
*H04J 3/00* (2006.01)
(Continued)

(52) U.S. Cl.
CPC ......... *H04L 5/0032* (2013.01); *H04B 1/7103* (2013.01); *H04J 11/0056* (2013.01);
(Continued)

(58) Field of Classification Search
CPC . H04L 5/0032; H04L 5/0007; H04L 27/2675; H04L 27/2691; H04L 27/2695;
(Continued)

(56) References Cited

U.S. PATENT DOCUMENTS

| 8,693,305 B2* | 4/2014 | Laroia ................. H04L 27/2663 370/203 |
| 8,737,499 B2* | 5/2014 | Sikri ................. H04L 25/03012 370/208 |

(Continued)

FOREIGN PATENT DOCUMENTS

| CN | 101707583 A | 5/2010 |
| CN | 102484630 A | 5/2012 |

(Continued)

OTHER PUBLICATIONS

PCT International Search Report, dated Feb. 8, 2013, in connection with International Application No. PCT/EP2012/069242, all pages.
(Continued)

*Primary Examiner* — Hanh N Nguyen
(74) *Attorney, Agent, or Firm* — Leffler Intellectual Property Law, PLLC

(57) ABSTRACT

The present application relates to a method of a wireless device for interference cancellation (IC) in a cellular radio network system comprising a serving network node serving said wireless device. The method comprises using a first IC method for at least partly removing a time aligned symbol of an interfering radio signal from at least a first symbol of a time slot received from the serving network node. The method also comprises using a second IC method, different from the first IC method, for at least partly removing a non-time aligned symbol of an interfering radio signal from at least a second symbol of said time slot received from the serving network node.

18 Claims, 11 Drawing Sheets

(51) Int. Cl.
*H04L 5/00* (2006.01)
*H04B 1/7103* (2011.01)
*H04J 11/00* (2006.01)

(52) U.S. Cl.
CPC .. *H04L 5/0007* (2013.01); *H04B 2201/70702* (2013.01); *H04B 2201/70707* (2013.01)

(58) Field of Classification Search
CPC . H04J 11/0056; H04J 11/0023; H04B 1/7103; H04B 1/38; H04B 2215/00; H04B 2201/70702
USPC ............... 370/203–210, 329–332, 503–510, 370/518–519; 455/444, 13.4, 524–525, 455/68, 115.3, 133–138
See application file for complete search history.

(56) References Cited

U.S. PATENT DOCUMENTS

| | | | | |
|---|---|---|---|---|
| 8,929,393 | B2* | 1/2015 | Gaal | H04B 1/7097 370/468 |
| 2005/0277400 | A1 | 12/2005 | Shah | |
| 2009/0117896 | A1 | 5/2009 | Baldemair et al. | |
| 2011/0045776 | A1 | 2/2011 | Laroia et al. | |
| 2011/0267937 | A1 | 11/2011 | Yoo et al. | |
| 2012/0063532 | A1* | 3/2012 | Yoshimoto | H04J 11/004 375/285 |

FOREIGN PATENT DOCUMENTS

| | | |
|---|---|---|
| EP | 1766800 A2 | 3/2007 |
| WO | 2004/100416 A1 | 11/2004 |
| WO | 2005125024 A2 | 12/2005 |
| WO | 2011/127438 A1 | 10/2011 |

OTHER PUBLICATIONS

PCT Written Opinion, dated Feb. 8, 2013, in connection with International Application No. PCT/EP2012/069242, all pages.

Damnjanovic, A. et al. "A survey on 3GPP heterogeneous networks" IEEE Wireless Communications, IEEE Service Center, Piscataway, NJ, US, vol. 18, No. 3, Jun. 1, 2011, pp. 10-21, XP011367614, ISSN: 1536-1284.

3GPP TS 36.331, Version 10.5.0, Protocol Specification (Release 10), Mar. 2012, pp. 1-302.

Damnjanovic, A. et al. "UE's Role in LTE Advanced Heterogeneous Networks" IEEE Communications Magazine, Feb. 2012, pp. 164-176.

Huawei et al. "Comparison of solutions for FeICIC of PBCH/PSS/SSS and Paging/SIB1" R1-113213, 3GPP TSG RAN WG1 Meeting #66bis, Oct. 10-14, 2011, Zhuhai, China, pp. 1-6.

Chinese Office Action, dated Feb. 17, 2017, in connection with Chinese Application No. 201280073982.6, 5 pages.

English language translation of Chinese Office Action, dated Feb. 17, 2017, in connection with Chinese Application No. 201280073982.6, 2 pages.

English language translation of Chinese Search Report, dated Feb. 17, 2017, in connection with Chinese Application No. 201280073982.6, 2 pages.

English language translation of Summary of First Office Action in connection with Chinese Application No. 201280073982.6, 1 page.

\* cited by examiner

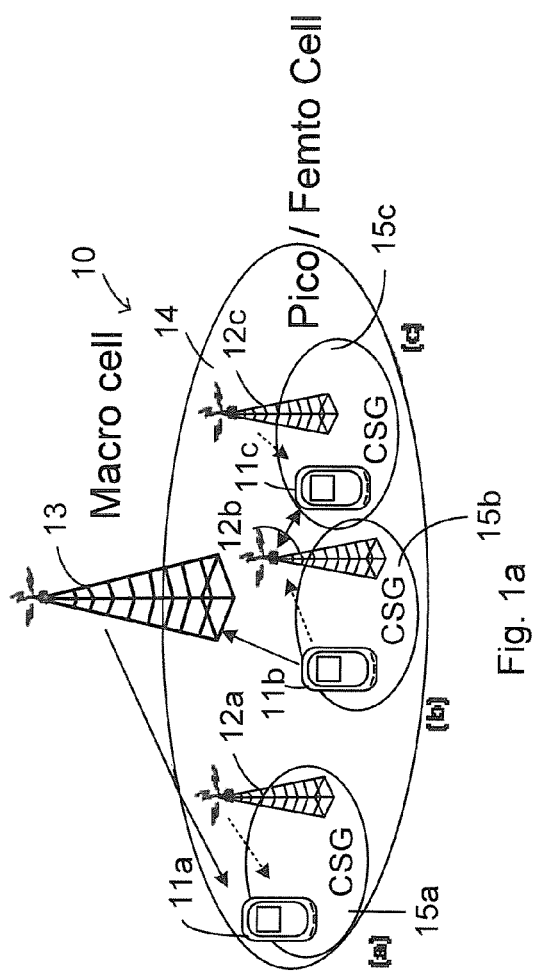
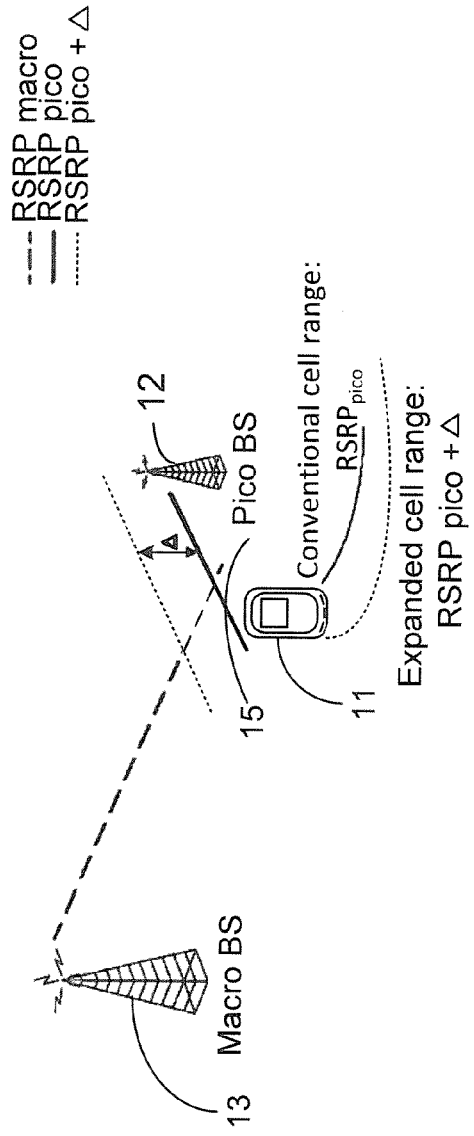
Fig. 1a
Fig. 1b

Timing for interfering cell (macro cell)

Macro CRS

Interfered REs

Timing for serving cell (pico cell), DFT window placement for UE

INTERFERENCE CANCELLATION IN WIRELESS NETWORKS

CROSS-REFERENCE TO RELATED APPLICATIONS

This application claims the benefit of U.S. Provisional Application 61/659,745, filed Jun. 14, 2012, which is hereby incorporated herein by reference in its entirety.

TECHNICAL FIELD

The present invention relates to interference cancellation principles in wireless communication networks and in particular in networks where high interference conditions may occur, e.g., in heterogeneous network deployments.

BACKGROUND

In the third generation partnership project (3GPP), heterogeneous network deployments have been defined as deployments where low-power nodes of different transmit powers are placed throughout a macro-cell (cells served by a radio base station (RBS) transmitting with higher power) layout, implying also non-uniform traffic distribution. Such deployments are, for example, effective for capacity extension in certain areas, so-called traffic hotspots, i.e. small geographical areas with a higher user density and/or higher traffic intensity where installation of pico nodes (a type of low-power radio base stations) can be considered to enhance performance. Heterogeneous deployments may also be viewed as a way of densifying networks to adopt for the traffic needs and the environment. However, heterogeneous deployments also bring challenges for which the network has to be prepared to ensure efficient network operation and improved user experience. Some challenges are related to the increased interference in the attempt to increase small cells associated with low-power nodes, aka cell range expansion; the other challenges are related to potentially high interference in uplink due to a mix of large and small cells.

According to 3GPP, heterogeneous deployments consist of deployments where low power nodes are placed throughout a macro-cell layout. The interference characteristics in a heterogeneous deployment can be significantly different than in a homogeneous deployment, in downlink or uplink or both.

Examples hereof with closed subscriber group (CSG) cells are given in FIG. 1a illustrating a communication network 10 comprising a macro cell 14 served by a macro node 13 and a plurality of pico/femto cells 15 (e.g., the pico/femto cells 15a, 15b, and 15c depicted in FIG. 1a) served by pico/femto nodes 12. In case (a), a macro user 11a (a user equipment (UE) connected to the macro RBS 13) with no access to the CSG cell 15a (served by a low-power RBS 12a) will be interfered by the low-power RBS 12a (e.g. a Home Node B, HeNB), in case (b) a macro user 11b causes severe interference towards the HeNB 12b and in case (c), a CSG user 11c served by CGS HeNB 12b is interfered by another CSG HeNB 12c. Heterogeneous deployments, however, are not limited to those with CSG involved.

Another example is illustrated in FIG. 1b, where the need for enhanced intercell interference cancellation (ICIC) techniques for downlink (DL) is particularly crucial when the cell assignment rule diverges from the reference signal received power (RSRP) based approach, e.g. towards pathloss- or pathgain-based approach, sometimes also referred to as the cell range expansion when adopted for cells with a transmit power lower than neighbor cells. In FIG. 1b, the cell range expansion of a pico cell 15 is implemented by means of a parameter Δ. The pico cell 15 is expanded without increasing its power, just by changing the reselection threshold, e.g., UE 11 selects cell of the pico RBS 12 as the serving cell when $RSRP_{pico+\Delta} \geq RSRP_{macro}$, where $RSRP_{macro}$ is the received signal strength measured for the cell 14 of the macro RBS 13 and $RSRP_{pico}$ is the signal strength measured for the cell of the pico RBS 12.

There are transmit patterns and measurement patterns for evolved ICIC (eICIC), i.e. ICIC in 3GPP long term evolution (LTE) standards. To facilitate measurements in the extended cell range, i.e., where high interference is expected, the standard specifies Almost Blank Subframe (ABS) patterns for evolved Node B (eNodeB or eNB) and restricted measurement patterns for user equipments (UEs). A pattern that can be configured for eICIC is a bit string indicating restricted and unrestricted subframes characterized by a length and periodicity, which are different for frequency division duplex (FDD) and time division duplex (TDD) (40 subframes for FDD and 20, 60 or 70 subframes for TDD). Only downlink (DL) patterns have been so far specified for interference coordination in 3GPP, although patterns for uplink (UL) interference coordination (IC) are also known.

An ABS pattern is a transmit pattern of an RBS 13 transmitting radio signals. The ABS pattern is cell-specific and may be different from the restricted measurement patterns signaled to the UEs 11. In a general case, ABS are low-power and/or low-transmission activity subframes. ABS patterns may be exchanged between eNodeBs via the X2 interface, but the patterns are not signaled to the UE, unlike the restricted measurement patterns.

Restricted measurement patterns (i.e. "time domain resource restriction patterns" [3GPP technical specification (TS) 36.331]) are configured to indicate to the UE 11 a subset of subframes for performing measurements, typically in lower interference conditions, where the interference may be reduced e.g. by means of configuring multicast broadcast single frequency network (MBSFN) subframes or ABS subframes of interfering eNodeBs 13.

Restricted measurement patterns may, however, also be configured for UEs 11 with good interference conditions, i.e., receiving a measurement pattern may not be necessarily an indication of expected poor signal quality. For example, a measurement pattern may be configured for a UE in the cell range expansion zone where typically high interference is expected, but a measurement pattern may also be configured for UEs located close to the serving base station 12 where the signal quality is typically good which may be for the purpose of enabling a higher-rank transmission modes (e.g., rank-two transmissions using multiple input multiple output (MIMO) transmission).

Restricted measurement patterns are in general UE-specific, although such patterns may be broadcasted or multicasted. Three patterns are currently specified in the LTE standard for enabling restricted measurements:

Serving-cell pattern for radio link monitoring (RLM) and radio resource management (RRM) measurements,
Neighbor-cell pattern for RRM measurements,
Serving-cell pattern for channel state information (CSI) measurements.

Transmit patterns and measurement patterns are means for coordinating inter-cell interference in wireless network and improve measurement performance. Alternatively or in addition to inter-cell interference coordination techniques, measurement performance may also be improved by using more advanced receiver techniques, e.g., interference suppression or interference cancellation techniques.

The UE 11 is generally aware about the serving cell(s) 12 configuration. However, the UE is not only receiving/sending data and performing measurements in the serving cell(s), it may also move, for which the information about neighbor cells may be helpful for mobility decisions, or the network or the network and/or the UE may also perform different radio resource management (RRM) tasks and hence measurements in neighbor cells may be needed. In LTE standard Release 10 (Rel-10), the UE may receive the aggregate neighbor cell information, e.g., an indication on whether all neighbor cells use the same MBSFN configuration as the primary cell (PCell).

Neighbor cells lists have been mandatory for mobility and RRM purpose in earlier networks, e.g., Universal Terrestrial Radio Access (UTRA). However, such lists (comprising e.g. neighbor cell identities) are optional in LTE, and the UE has to meet the same requirements, irrespective of whether the neighbor cell information is provided to the UE or not.

Further, the UE 11 also receives interference from neighbor cells 13 and the UE receiver may benefit from the knowledge about the interference character (e.g., when the interfering signal occurs and where in the frequency dimension). In LTE Rel-10, to enable eICIC, the UE may receive measurement patterns via its serving cell or PCell (if channel aggregation is used), as described above, for measurements in the serving cell or neighbor cells. In the latter case, only one measurement pattern is provided per frequency for multiple measurement cells, together with the list of physical cell identities (PCIs). In Rel-11, the UE should be capable to deal with even higher interference and hence even more network assistance may be needed for the UE. For example, it has been proposed that the UE should be provided the information about the number of common reference signal (CRS) ports and the MBSFN configuration of at least some interfering cells.

In LTE Rel-10, enhanced interference coordination techniques have been developed to mitigate potentially high interference, e.g., in a cell range expansion zone, while providing the UE with time-domain measurement restriction information. Further, for LTE Rel-11, advanced receivers based on Minimum Mean Square Error-Interference Rejection Combining (MMSE-IRC) with several covariance estimation techniques and interference-cancellation-capable receivers are being studied. One example of such IC receivers are receivers capable of removing interference from known signals (for instance CRSs transmitted in all macro cells in all sub frames). The CRS then interfere also in blank sub frames, i.e. in sub frames where the macro cell does not transmit data, in the particular resource elements (REs) where the CRSs are transmitted. An advanced IC receiver can in principle estimate the received signal from the macro cell at REs where known CRSs are transmitted and then subtract that interference in these REs. Then the decoding of data from the pico cell RBS is made.

US 2011/0267937 discloses a method to enhance coverage and/or throughput in a heterogeneous wireless network, including detecting interference between a neighbouring cell and a serving cell. The method also includes cancelling the interference using an adaptive technique based on whether the interference has colliding Common Reference Signal (CRS) tones. According to this document, a UE may adaptively apply a particular CRS cancellation approach for a given scenario. Thus, the UE may choose one of the algorithms depending on the cell IDs the UE sees, where cell IDs indicate whether the interference includes colliding CRS tones. One algorithm is chosen if the cell ID indicates that the interfering CRS tones are colliding, and another algorithm is chosen if the cell ID indicates that the interfering CRS tones are not colliding.

SUMMARY

Since a macro cell typically should cover a large area, while a pico cell only covers small hot spots, the two cells may use different lengths of the cyclic prefix (CP). The 3GPP LTE standard defines two different lengths of the CP, long (16.6 microseconds) and short (approximately 4.7 microseconds). In case of short cyclic prefix use, it is possible to include 7 orthogonal frequency-division multiplexing (OFDM) symbols per time slot (0.5 milliseconds) while in the long CP case, there will be 6 OFDM symbols per time slot. In the short CP case, CRSs are transmitted in OFDM symbol 0 and 4 in each slot, while in the long CP case CRSs are transmitted in OFDM symbol 0 and 3. FIG. 2 shows a principal sketch over the timing for respective OFDM symbol in the long and short CP case. The darker OFDM symbols are the OFDM symbols including CRSs and the dashed symbols do not contain any CRS. The small white spaces in between the dashed and dark areas are the CP for the following symbol. In the first OFDM symbol, when performing a discrete Fourier transform (DFT), or a Fast Fourier transform (FFT) corresponding to the pico (short CP) cell transmission, all information about the first OFDM symbol for the Macro (long CP) cell is included since the displacement of the first symbol of the macro cell in respect of the first symbol of the pico cell is only within the CP of the macro cell. However OFDM symbol 4 of the pico cell will only partly overlap with the OFDM symbol 3 (including CRS) of the macro cell. The inventors have realized that at least the following problems may occur in the scenario of FIG. 2:

When doing IC for removing macro CRSs from a received pico cell transmission, not all information is included in the pico DFT window, hence standard IC approaches for OFDM systems are not applicable (cf. FIG. 2, symbols 3 and 4, respectively, where CRS is included).

The sliding timing (displacement) over the slot when comparing the macro and pico cells makes it not possible to use the same IC approach discussed above in relation to the symbols 0 in FIG. 2 in all OFDM symbols for removing known interfering signals from the macro cell interfering the serving (pico) cell (FIG. 2 showing how six symbols 0-5 are comprised in a slot when long CP is used and seven symbols 0-6 are comprised in a slot when short CP is used).

It is an objective of the present disclosure to provide a method and apparatus for solving the above mentioned problems.

According to an aspect of the present disclosure, there is provided a method of a wireless device for interference cancellation (IC) in a cellular radio network system. The system comprises a serving network node serving the wireless device. The method comprises using a first IC method for at least partly removing a time aligned symbol of an interfering radio signal from at least a first symbol of a time slot received from the serving network node. The method also comprises using a second IC method, different from the first IC method, for at least partly removing a non-time aligned symbol of an interfering radio signal from at least a second symbol of said time slot received from the serving network node.

According to another aspect of the present disclosure, there is provided a wireless device. The device comprises processor circuitry, and radio receiver circuitry. The processor circuitry is configured for, in cooperation with the receiver circuitry, using a first IC method for at least partly removing a time aligned symbol of an interfering radio signal from at least a first symbol of a time slot received from a serving network node. The processor circuitry is also configured for, in cooperation with the receiver circuitry, using a second IC method, different from the first IC method, for at least partly removing a non-time aligned symbol of an interfering radio signal from at least a second symbol of said time slot received from the serving network node.

According to another aspect of the present disclosure, there is provided a wireless device. The device comprises a processor, and a memory storing instructions that, when executed by the processor, cause the device to use a first IC method for at least partly removing a time aligned symbol of an interfering radio signal from at least a first symbol of a time slot received from a serving network node. The instructions also cause the device to use a second IC method, different from the first IC method, for at least partly removing a non-time aligned symbol of an interfering radio signal from at least a second symbol of said time slot received from the serving network node.

According to another aspect of the present disclosure, there is provided a wireless device. The device comprises means for using a first IC method for at least partly removing a time aligned symbol of an interfering radio signal from at least a first symbol of a time slot received from a serving network node. The device also comprises means for using a second IC method, different from the first IC method, for at least partly removing a non-time aligned symbol of an interfering radio signal from at least a second symbol of said time slot received from the serving network node.

Any of the method aspects above of the present disclosure can in some embodiments be used for performing the method aspect above of the present disclosure.

According to another aspect of the present disclosure, there is provided a computer program product comprising computer-executable components for causing a wireless device to perform an embodiment of a method of the present disclosure when the computer-executable components are run on a processor comprised in the device.

According to another aspect of the present disclosure, there is provided a computer program for interference cancellation (IC) in a cellular radio network system, where the system comprises a serving network node serving a wireless device. The computer program comprises computer program code which is able to, when run on a processor of the wireless device, cause the wireless device to use a first IC method for at least partly removing a time aligned symbol of an interfering radio signal from at least a first symbol of a time slot received from the serving network node. The code is also able to cause the device to use a second IC method, different from the first IC method, for at least partly removing a non-time aligned symbol of an interfering radio signal from at least a second symbol of said time slot received from the serving network node.

According to another aspect of the present disclosure, there is provided a computer program product comprising an embodiment of a computer program of the present disclosure and a computer readable means on which the computer program is stored.

It is advantageous to use a first IC method for removing an interfering signal from a first symbol and a second, different, IC method for removing an interfering signal from a second symbol since the interfering signal(s) may have different properties, interfere in different ways, with the different symbols of a time slot, e.g. a frame or subframe. For example, as discussed below, a cyclic prefix (CP) may be used both for the serving time slot and in the interfering signal. If this CP has a different length in the interfering signal than in the time slot, the time alignment of the respective interfering symbols in relation to the symbols of the serving time slot will vary for different symbols of the time slot. It may thus e.g. be possible to use a simpler (less complex) IC method e.g. for the first symbol than for the second symbol, allowing resources available for interference cancellation to be better optimized. It is noted that the first and second symbols of the time slot may be interfered by an interfering signal from one or several neighbouring network nodes, or the first symbol may be interfered by an interfering signal from a first neighbouring network node or set of network nodes and the second symbol may be interfered by an interfering signal from a second neighbouring network node or set of network nodes.

In some embodiments, the first and second symbols received from the serving network node, as well as the time aligned and non-time aligned symbols of the interfering signal, are Orthogonal Frequency Division Multiplexing (OFDM) symbols. Such symbols may use a cyclic prefix of different lengths, which is a case where the methods and devices of the present disclosure may conveniently be used.

In some embodiments, the interfering radio signal of the time aligned symbol and the interfering signal of the non-time aligned signal are known by the wireless device. The interfering signal may e.g. comprise a CRS signal, a pilot signal, a synchronization signal or the like, which is known by the device and thus can be more easily and more fully cancelled. Thus, in some embodiments, at least one of the interfering radio signal of the time aligned symbol and the interfering signal of the non-time aligned signal is a Common Reference Signal (CRS), a pilot signal or a synchronization signal.

In some embodiments, the interfering radio signal of the non-time aligned symbol comprises a cyclic prefix, CP, which has a length that is different from a length of a CP used in the time slot of the first and second symbols (received from the serving network node). As discussed herein, this is a possible situation where non-time aligned interference may occur.

In some embodiments, the first IC method, for removing the time aligned interfering symbol, comprises performing a discrete Fourier transform (DFT) operation on a time window of the time slot, the time window corresponding to at least the first symbol. The first IC method of these embodiments also comprises estimating the interfering signal within the time window. The first IC method of these embodiments also comprises subtracting the estimated interfering signal from said at least the first symbol within said time window. These embodiments of the first IC method may conveniently be used to cancel a time aligned interfering symbol.

In some embodiments, the second IC method, for removing the non-time aligned interfering symbol, comprises performing a first DFT operation on a first time window of the time slot, the time window corresponding to said non-time aligned symbol of the interfering signal, whereby a frequency domain representation of the interfering signal in the first time window is obtained. The second IC method of these embodiments also comprises estimating the interfering signal within said first time window. The second IC method of these embodiments also comprises performing a second DFT operation on a second time window of the time slot, the second time window corresponding to said at least a second symbol, whereby a frequency domain representation of said at least a second symbol in the second time window is obtained. The second IC method of these embodiments also comprises distributing the estimated interfering signal over the frequency domain representation of said at least a second symbol. The second IC method of these embodiments also comprises subtracting the estimated interfering signal from said at least a second symbol in frequency domain.

In some other embodiments, the second IC method, for removing the non-time aligned interfering symbol, comprises performing a first DFT operation on a time window of the time slot, the time window corresponding to said non-time aligned symbol of the interfering signal, whereby a frequency domain representation of the interfering signal in the time window is obtained. The second IC method of these embodiments also comprises estimating a channel for the interfering signal in a frequency domain representation within said time window. The second IC method of these embodiments also comprises performing an inverse DFT (IDFT) on the frequency domain representation of the interfering signal, whereby a time domain representation of the interfering signal in the time window is obtained. The second IC method of these embodiments also comprises subtracting the estimated interfering signal from said at least a second symbol in time domain.

In some other embodiments, the second IC method, for removing the non-time aligned interfering symbol, comprises performing a DFT operation on a time window of the time slot, the time window corresponding to said at least a second symbol, whereby a frequency domain representation of said at least a second symbol in the time window is obtained. The second IC method of these embodiments also comprises determining said at least a second symbol which are affected by the interfering signal of the non-aligned symbol. The second IC method of these embodiments also comprises estimating the interfering signal in frequency domain based on a known difference in timing between the non-aligned symbol and the at least a second symbol. The second IC method of these embodiments also comprises subtracting the estimated interfering signal from said at least a second symbol in frequency domain.

The above embodiments of the second IC method may conveniently be used when the interfering symbol is not time aligned. The choice of which embodiment of the second IC method to use may depend on the nature of the interference and/or on the configuration of the wireless device and the circuitry of its radio receiver.

In some embodiments, the first and/or second IC method is chosen from a plurality of different methods based on hardware and/or software resources available for IC in the wireless device. The second IC method may e.g. be chosen among the different second IC method embodiments discussed above and/or e.g. a less complex first IC method when the interfering symbol is time aligned may be chosen if the processing resources available for IC are limiting.

Embodiments of the present disclosure describe methods and apparatuses for interference cancelling in a receiver operating in a cellular system e.g. an OFDM based cellular communication system. Particularly, the present disclosure describes methods for interference cancellation (IC) of known interfering signals (like Common Reference Signals (CRS), pilot signals and/or synchronization signals) in case an interfering signal (from a neighboring cell) is non-time aligned with the desired signal from the serving cell. The disclosure covers for instance the scenario where an interfering macro cell uses long CP and the serving (pico) cell uses short CP, but the methods and devices of the present disclosure may also be convenient in other cases where symbols of an interfering signal are not time aligned. A first IC method may be used for a first set of OFDM symbols where interfering symbols are time aligned, and a second IC method may be used for a second set of OFDM symbols where interfering symbols are not time aligned. The first IC method may thus be an IC method assuming the OFDM symbols for the two cells are time-aligned, and the second IC method may assume that OFDM symbols for the two cells are non-time aligned. The present disclosure furthermore covers several different embodiments of such a second IC method when the two cells are non-time aligned. It should be noted that an IC method which can be used when the interfering signal is not time aligned may also be used when the interfering signal is time aligned, whereby the use of two different IC methods may not be needed in some embodiments of the present disclosure.

The different aspects and embodiments of the present disclosure give at least one or several of the following advantages:

Choice of IC methods to use at different OFDM symbols in heterogeneous network scenarios where the different cells use different CP length.

IC methods suitable to use in scenarios where a serving cell and a neighboring interfering cell use different timing.

Possibility to use different IC methods based on available hardware (HW) and software (SW) resources depending on e.g. system bandwidth.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which:

FIG. 1a schematically illustrates a wireless communication system comprising a macro cell and a plurality of pico or femto cells covering respective geographical areas at least partly overlapping the area covered by the macro cell.

FIG. 1b schematically illustrates cell range expansion of a pico cell covering an area also covered by a macro cell base station (BS).

DETAILED DESCRIPTION

Figure 2:
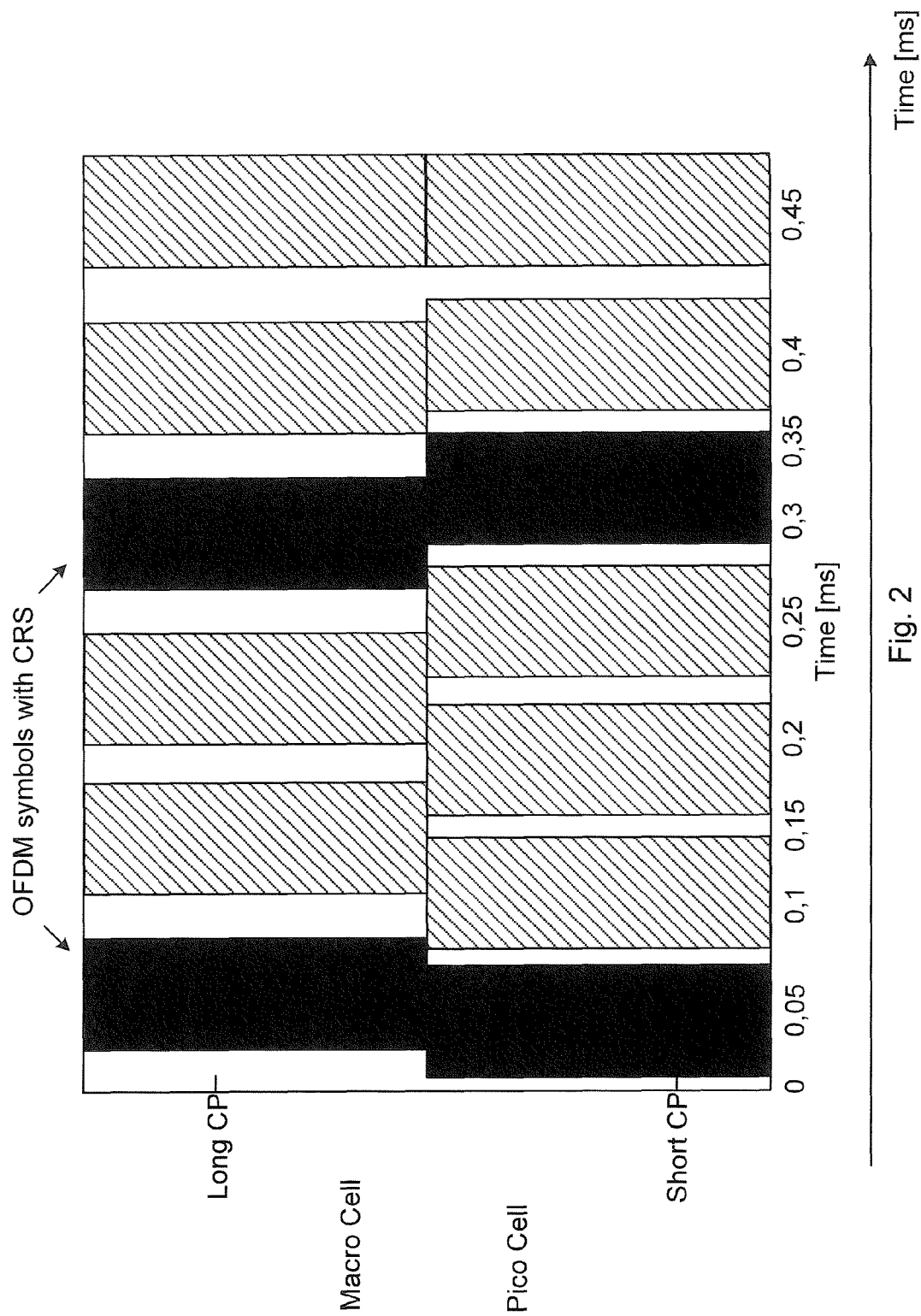
FIG. 2 is a schematic diagram illustrating the positions of symbols in time domain within a time slot when long CP and short CP, respectively, are used.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description. It is noted that FIGS. 1a and 1b have been used for discussing the background of the present disclosure. However, the devices and methods of the present disclosure may conveniently be used in the situations illustrated in FIGS. 1a and 1b, why reference is made to those figures also here in the detailed description of the disclosure. Thus, when reference is made hereafter e.g. to a UE or wireless device 11, a wireless device in accordance with the present disclosure is referenced, not a UE of the background.

The wireless device 11 discussed herein may be any type of device able to receive radio signals. Suitable wireless devices e.g. communication terminals or UEs may include mobile devices e.g. a mobile phone or a portable computer, or stationary devices such as sensors, vending machines, household appliances etc. or radio base stations (RBSs). The terms "wireless device" and "UE" are used interchangeably in the description. A UE may comprise any device equipped with a radio interface and capable of at least receiving a radio signal from a radio network node (i.e. a RBS) and/or another wireless device. The UE may also be capable of receiving and decoding a radio signal from a RBS or other wireless device. The UE may also be capable of generating and transmitting a radio signal. Note that some radio network nodes may also be equipped with a UE-like interface. Some additional examples of "UE" that are to be understood in a general sense are mobile phones, iPhone, personal digital assistant (PDA), laptop, sensor, fixed relay, mobile relay, any radio network node equipped with a UE-like interface (e.g., small RBS, eNodeB, femto RBS, Location Measurement Unit (LMU), etc.). A wireless device may be capable of operating in one or more frequencies and with one or more radio access technologies (RATs) (e.g., an example dual-mode user equipment may operate with any two: WiFi, LTE/LTE-A, High Speed Packet Access (HSPA), Global System for Mobile Communications (GSM)), and some devices may also support operation in multiple frequencies and/or multiple RATs in parallel (e.g., wireless devices configured for carrier aggregation). A wireless device may also support multi-tag (aka multi-link) operation on the same frequency, e.g., with coordinated multipoint (CoMP). A wireless device may have more than one serving cell (e.g., a Primary Cell (PCell), and one or more secondary cells (SCells) in carrier aggregation). A cell may also be a virtual cell associated with a transmit node, and it may or may not share the same cell ID with another transmit node.

A UE or wireless device 11 comprises a processor e.g. a central processing unit (CPU). The processor may comprise one or a plurality of processing units in the form of microprocessor(s). However, other suitable devices with computing capabilities could be comprised in the processor, e.g. an application specific integrated circuit (ASIC), a field programmable gate array (FPGA) or a complex programmable logic device (CPLD). The processor is configured to run one or several computer program(s) or software stored in a storage unit e.g. a memory. The storage unit is regarded as a computer readable means and may e.g. be in the form of a Random Access Memory (RAM), a Flash memory or other solid state memory, or a hard disk. The processor is also configured to store data in the storage unit, as needed. The wireless device also comprises a transmitter, a receiver and an antenna, which may be combined to form a transceiver or be present as distinct units within the wireless device. The transmitter is configured to cooperate with the processor to transform data bits to be transmitted over a radio interface to a suitable radio signal in accordance with the RAT used by the radio access network (RAN) via which the data bits are to be transmitted. The receiver is configured to cooperate with the processor to transform a received radio signal to transmitted data bits. The antenna may comprise a single antenna or a plurality of antennas, e.g. for different frequencies and/or for MIMO (Multiple Input Multiple Output) communication. The antenna is used by the transmitter and the receiver for transmitting and receiving, respectively, radio signals.

A radio network node is a radio node comprising an apparatus transmitting at least one radio signal and comprised in a radio communications network. It may or may not generate the transmitted signal sequence, e.g., it may be a radio base station (RBS), relay, beacon device, remote radio unit (RRU), or it may also be a transmitting antenna or a remote radio head (RRH), or it may even be a repeater.

A radio network node 12, 13 may or may not create an own cell 14, 15, it may share a cell with another radio node or it may operate in a cell sector (a logical or geographical part of a cell, which in some embodiments may also be referred in a generic way to as a "cell"). A radio network node may be associated with more than one cell. A radio network node may be capable of operating in one or more frequencies and in one or more RATs (e.g., a multi-standard radio base station, aka MSR BS, supporting any one or more of: WiFi, LTE/LTE-A, HSPA, GSM), and some radio network nodes may also support operation in multiple frequencies and/or multiple RATs in parallel (e.g., serving a wireless device configured with carrier aggregation or even serving multiple wireless device in different frequencies and/or RATs). A radio network node may be equipped with multiple antennas, co-located and/or distributed. A radio network node may also support multi-tag (aka multi-link) operation on the same frequency, e.g., with Coordinated Multi-Point (CoMP) transmission.

A network node may be any radio network node or a network node not comprised in a radio network (e.g., in a core network). Some non-limiting examples of a network node are a radio base station, eNodeB, radio network controller, positioning node, Mobility Management Entity (MME), self organizing network (SON) node, minimization of drive tests (MDT) node, a coordinating node, and operations & maintenance (O&M) node.

A RBS 12, 13 comprises a processor e.g. a central processing unit (CPU). The processor may comprise one or a plurality of processing units in the form of microprocessor(s). However, other suitable devices with computing capabilities could be comprised in the processor, e.g. an application specific integrated circuit (ASIC), a field programmable gate array (FPGA) or a complex programmable logic device (CPLD). The processor is configured to run one or several computer program(s) or software stored in a storage unit e.g. a memory. The storage unit is regarded as a computer readable means and may e.g. be in the form of a Random Access Memory (RAM), a Flash memory or other solid state memory, or a hard disk. The processor is also configured to store data in the storage unit, as needed. The RBS also comprises a transmitter, a receiver and an antenna, which may be combined to form a transceiver or be present as distinct units within the RBS. The transmitter is configured to cooperate with the processor to transform data bits to be transmitted over a radio interface to a suitable radio signal in accordance with the radio access technology (RAT) used by the Radio Access Network (RAN) via which the data bits are to be transmitted. The receiver is configured to cooperate with the processor to transform a received radio signal to transmitted data bits. The antenna may comprise a single antenna or a plurality of antennas, e.g. for different frequencies and/or for MIMO (Multiple Input Multiple Output) communication. The antenna is used by the transmitter and the receiver for transmitting and receiving, respectively, radio signals. If the scheduling apparatus is integrated or otherwise associated with the RBS, the processor of the RBS may also function as the processor of the apparatus, the storage unit of the RBS may also function as the storage unit of the apparatus, the transmitter of the RBS may also function as the transmitter of the apparatus, and/or the receiver of the RBS may also function as the receiver of the apparatus.

A heterogeneous network is a wireless network system comprising low-power RBS 12 which is configured to serve a cell 15 which is at least partly encompassed within an area covered by a cell 14 served by a high-power RBS 13, the high- and low-power RBS transmitting with high and low power, respectively, compared with each other. The different cells may be any of e.g. a macro cell served by a macro RBS, a micro cell served by a micro cell RBS, a pico cell served by a pico RBS, a femto cell served by a femto RBS and a cell served by a Home Node B. Herein, the high-power RBS is exemplified with a macro RBS and the low-power RBS with a pico RBS. However, other types of RBS are also possible. For example, low-power RBS(s) of a system may comprise micro, pico and/or femto RBS(s).

The described embodiments are not limited to LTE, but may apply with any system utilizing OFDM transmission, for instance WiFi (wireless local area network, WLAN) and Wimax). However, the present disclosure may be advantageously used in LTE. The LTE/E-UTRA radio frame of 10 milliseconds (ms) includes ten 1 ms sub-frames and each subframe consists of two slots. The transmitted signal in each slot is described by a resource grid of sub-carriers (in the frequency domain) and available OFDM symbols (in the time domain). Each smallest element in the frequency-time resource grid is called a resource element (RE) and each resource element corresponds to one complex-valued modulation symbol. The number of OFDM symbols per sub-frame is 7 for normal cyclic prefix and 6 for extended cyclic prefix.

The term slot used herein is an example resource in the time domain, and in a more general case it may be any pre-defined time instance or time period (e.g., transmission time interval (TTI), radio frame, subframe, etc.).

The embodiments described herein may be independent embodiments or any embodiment may be combined in any combination with at least one other embodiment (or applied together) fully or in part.

The serving symbol, and optionally also the interfering symbol, discussed in the present disclosure may conveniently be an orthogonal frequency-division multiplexing (OFDM) symbol. In general, an OFDM symbol comprises a plurality of sub-carriers, i.e. resource elements (RE), hence an RE is a subset of information contained in the OFDM symbol.

Figure 3:
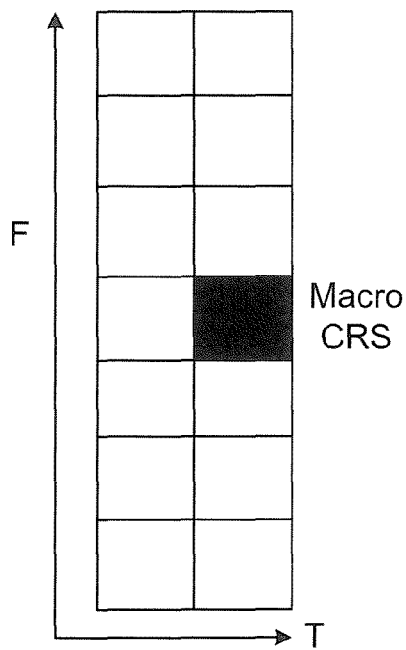
FIG. 3 is a schematic diagram illustrating interference in frequency (vertical extension) and time (horizontal extension) domain when an interfering macro cell CRS (left REs) is not time aligned with performed DFT on a transmission received by a UE connected to the pico cell (right REs).
Figure 3:
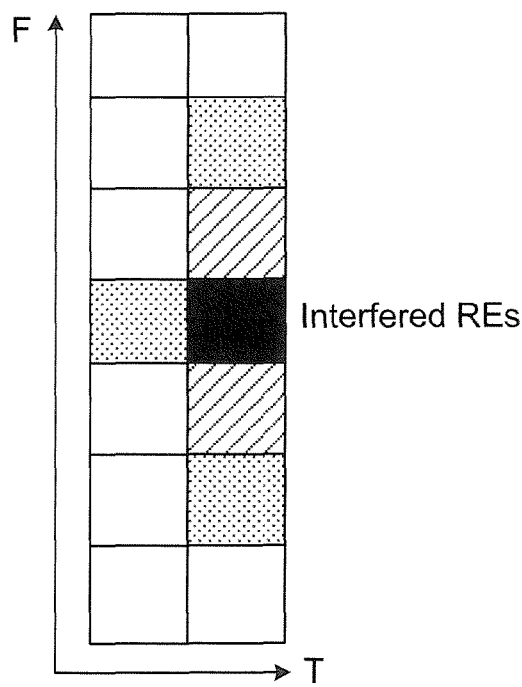

FIG. 3 schematically illustrates how a known signal transmitted in one Resource Element (RE) (i.e. one sub carrier in one OFDM symbol) distributes over several REs in case of a misaligned DFT window. FIG. 3 shows a principal sketch of how interference of a CRS of a macro node 13 is distributed over several REs of a pico node 12 if the DFT window of the Pico cell 15 and the DFT window of the macro cell 14 are not time aligned. RE with highest interference is black in the lower diagram, illustrating the serving pico cell 15, in the figure, whereas intermediate strength interference is illustrated by striped REs and lower interference by dotted REs. The misalignment introduces Inter Symbol Interference (ISI), i.e. an adjacent symbol interferes with a present symbol, and Inter Carrier interference (ICI), i.e. adjacent subcarriers of the different cells interfere with each other. The number of REs affected by ISI and ICI depends on the misalignment of the DFT window, and can be determined if the timing difference is known. The RE of the serving cell which is closest to the interfering RE is affected most, and then the interference decays as a function of the distance to the most interfered RE. In the scenario with a macro cell 14 using long CP and a serving pico cell 15 using short CP, as discussed above, the misalignment for each symbol in a slot is known to the wireless device for each OFDM symbol (see FIG. 2), and therefore also the amount of ISI/ICI introduced on adjacent REs. The present disclosure also covers other embodiments with non-time aligned first and second cells (also in cases where they have the same length of CP and/or where the RBSs serving the cells are transmitting with the same power (heterogeneous system or not)). Also in such cases, the timing of strong neighboring cells are known to the wireless device 11 from the cell search procedure, i.e. when the device search for the Primary and Secondary Synchronization signals (PSS/SSS) in order to find suitable cells for possible handover (HO). Hence, the embodiments presented herein utilize the way a known signal transmitted in a particular RE from an interfering cell distributes over several REs of a serving cell 15 once the DFT window of a received signal from the serving cell is not time-aligned with the interfering cell 14 OFDM symbol.

The DFT and IDFT operations discussed herein will now be generally discussed below with reference to equations.

The Discrete Fourier Transform (DFT) of the serving time domain signal $x_n$ is defined as $$X_k = \frac{1}{N}\sum_{n=0}^{N-1} x_n \exp\left(-i2\pi * \frac{k*n}{N}\right), \quad (I)$$

where N is the length of the DFT window, k is a frequency bin(subcarrier), n is sample in time, and the Inverse Discrete Fourier Transform (IDFT) of the frequency domain signal $X_k$ is defined as $$x_n = \sum_{n=0}^{N-1} X_k \exp\left(i2\pi * \frac{k*n}{N}\right). \quad \text{(II)}$$

Now we only consider one interfering CRS pilot on a frequency bin kp. It can be written as $$x_n = p * \exp\left(i2\pi * \frac{kp*n}{N}\right), n = 0, \cdots, N-1 \quad \text{(III)}$$

where p is the CRS pilot value, and kp is the frequency bin for that pilot. If a DFT is performed on the CRS symbol with time alignment, then $$X_k = \begin{cases} p & k = kp \\ 0 & \text{otherwise} \end{cases} \quad \text{(IV)}$$

if a DFT is performed on a part M of a signal, where M<N and $x_n=0$ for n>M−1. The $x_n$ is set to zero because samples from the next symbol are unknown. DFT on a part of a signal, non time aligned cells and k is not equal to kp is $$X_k = \frac{1}{N} \sum_{n=0}^{M-1} x_n \exp\left(-i2\pi * \frac{k*n}{N}\right) \quad \text{(V-VIII)}$$

$$= \frac{1}{N} \sum_{n=0}^{M-1} p * \exp\left(i*2\pi * \frac{kp*n}{N}\right) \exp\left(-i2\pi * \frac{k*n}{N}\right)$$

$$= \frac{p}{N} \sum_{n=0}^{M-1} \exp\left(i2\pi * \frac{n}{N} * (kp-k)\right)$$

$$= \frac{p}{N} \frac{\exp\left(i2\pi * \frac{M}{N} * (kp-k)\right) - 1}{\exp\left(i2\pi * \frac{1}{N} * (kp-k)\right) - 1}$$

DFT on a part of a signal, non time aligned cells and k=kp is $$X_k = \frac{1}{N} \sum_{n=0}^{M-1} x_n \exp\left(-i2\pi * \frac{k*n}{N}\right) \quad \text{(IX-XII)}$$

$$= \frac{1}{N} \sum_{n=0}^{M-1} p * \exp\left(-i2\pi * \frac{k*n}{N}\right)$$

$$= \frac{p}{N} \sum_{n=0}^{M-1} \exp\left(i2\pi * \frac{n}{N} * (kp-k)\right)$$

$$= p * \frac{M}{N}$$

For simplicity we have used the first samples of $x_n$ in the DFT calculations above. It is possible to think of other parts of $x_n$ that can be used in the DFT operation depending on the cells time alignment. For other sets of $x_n$ there will be a phase rotation also included in the expressions above.

Figure 4:
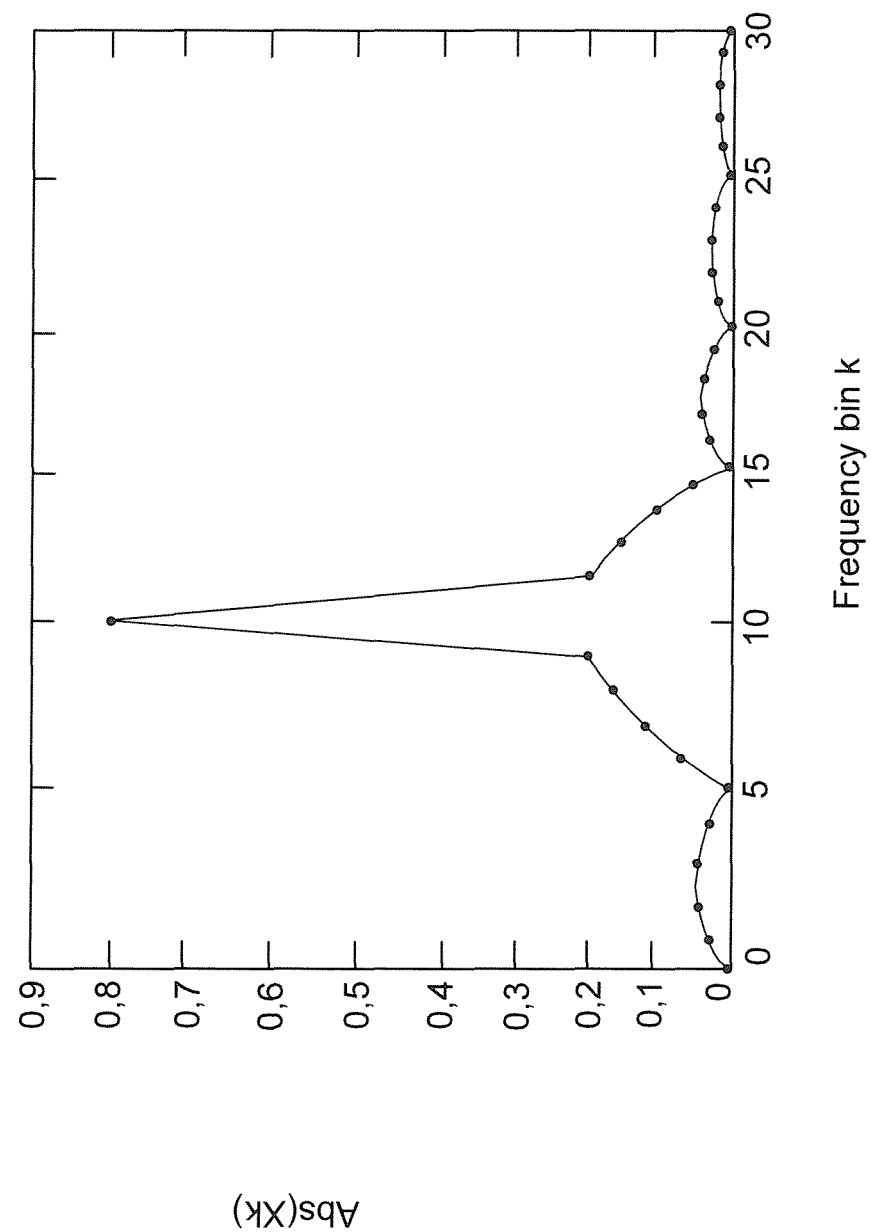
FIG. 4 is an experimental graph.

The plot of FIG. 4 shows an example how fast the signal strength/or power of the closest neighbouring frequency bin around kp decreases with N=256, M=N−50, kp=10, p=1. Most of the power is in the frequency bin k=kp, where as k close to kp have several factors higher power than the rest of the k's.

Figure 5:
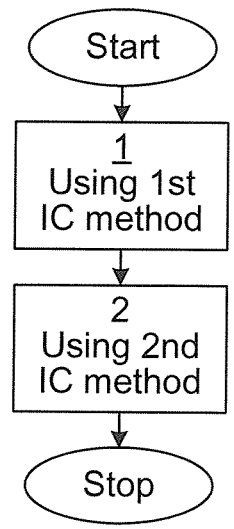
FIG. 5 is a schematic flow chart of an embodiment of a method of the present disclosure.

FIG. 5 is a schematic flow chart of an embodiment of a method of the present invention. A first IC method is used 1 for at least partly removing a time aligned symbol of an interfering radio signal from at least a first symbol of a time slot received from the serving network node 12. Also, a second IC method, which is different from the first IC method, is used 2 for at least partly removing a non-time aligned symbol of an interfering radio signal from at least a second symbol of said time slot received from the serving network node 12. By using 1 a first IC method for removing an interfering signal from a first symbol and using 2 a second, different, IC method for removing an interfering signal from a second symbol, interfering signals may be removed even when the interfering signal(s) have different properties, interfere in different ways, with the different symbols of a time slot, e.g. a frame or subframe. For example a cyclic prefix (CP) may be used both for the serving time slot and in the interfering signal. If this CP has a different length in the interfering signal than in the time slot used in the serving cell 15, the time alignment of the respective interfering symbols in relation to the symbols of the serving time slot will vary for different symbols of the time slot. It may thus e.g. be possible to use a simpler (less complex) IC method e.g. for the first symbol than for the second symbol, allowing resources available for interference cancellation to be better optimized. It is noted that the first and second symbols of the time slot may be interfered by an interfering signal from one or several neighbouring RBSs, or the first symbol may be interfered by an interfering signal from a first neighbouring RBS or set of RBSs and the second symbol may be interfered by an interfering signal from a second neighbouring RBS or set of RBSs.

Figure 6:
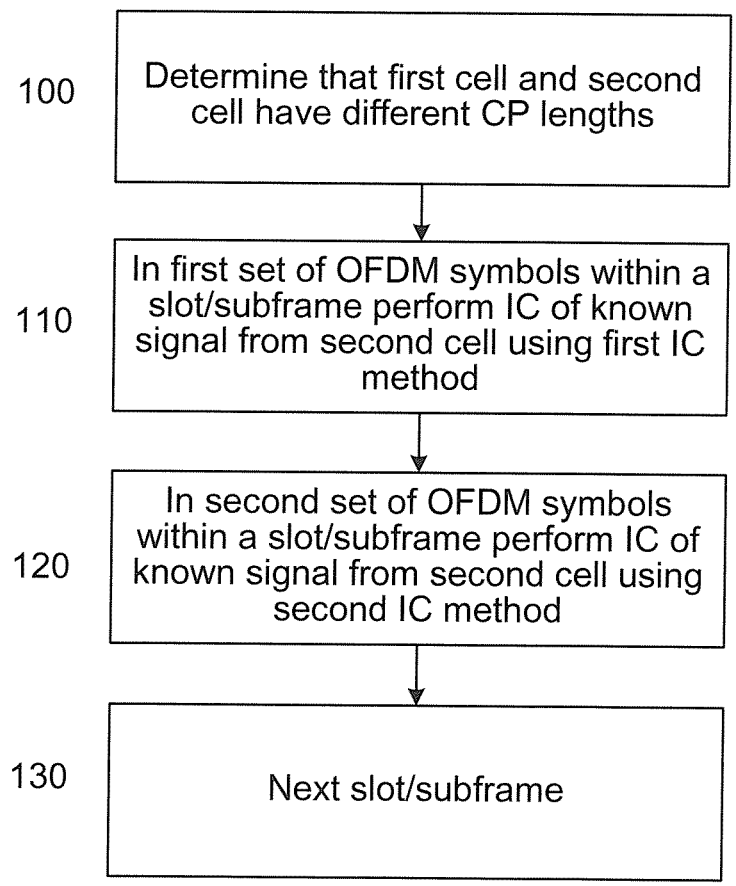
FIG. 6 is a schematic flow chart of another embodiment of a method of the present disclosure.

FIG. 6 is a schematic flow chart of another embodiment of a method of the present disclosure. In this embodiment, the wireless device 11 is connected to a first cell 15 (e.g. pico cell) and is interfered on known REs by a known signal (CRSs) transmitted from an interfering second cell 14 (e.g. macro cell). Since the device 11 knows the cell identity on the macro cell (as detected by a cell search unit), it also knows the pilot signals and which REs that includes the known (e.g. pilot) signals that can be cancelled using IC, in order to improve the reception of the serving first (pico) cell transmissions. The wireless device first determines 100 that the second cell and first cell have different CP length. This may be determined from cell search or from signaling (dedicated (radio resource control, RRC) or broadcasted) from the serving cell, or be blindly detected by the device. In this way the device knows the time drift (misalignment) of OFDM symbols between the first and second cells. Then, for a first set of OFDM symbols in a slot, the device performs 110 IC of known signals from the second cell using a first IC method. The first set of OFDM symbols may include one or several OFDM symbols. They may furthermore not be consecutive in a slot, and hence the first set may include e.g. the first and last OFDM symbol in a slot. The symbols of the set on which the first IC method is used are symbols where the interfering REs are not misaligned, or are not more misaligned than is allowed e.g. by the CP used (cf. symbols 0 in FIG. 2). The device also performs 120 IC of known signals from the second cell using a second IC method in a second subset of OFDM symbols. Again the second subset may be a single symbol or include several OFDM symbols. The symbols of the second set are misaligned such that the whole interfering symbol is not within the DFT window used for a RE of the serving cell signal. The embodiment may optionally further also include using a third, fourth etc. IC method on a third, fourth etc. set of OFDM symbols in a slot (or sub frame or similar). The symbols of the third, fourth etc. set may also be misaligned, possibly in a different way than the symbols of the second set. Once the slot (sub frame) is ended, the device starts again 130 on the next slot.

Figure 7:
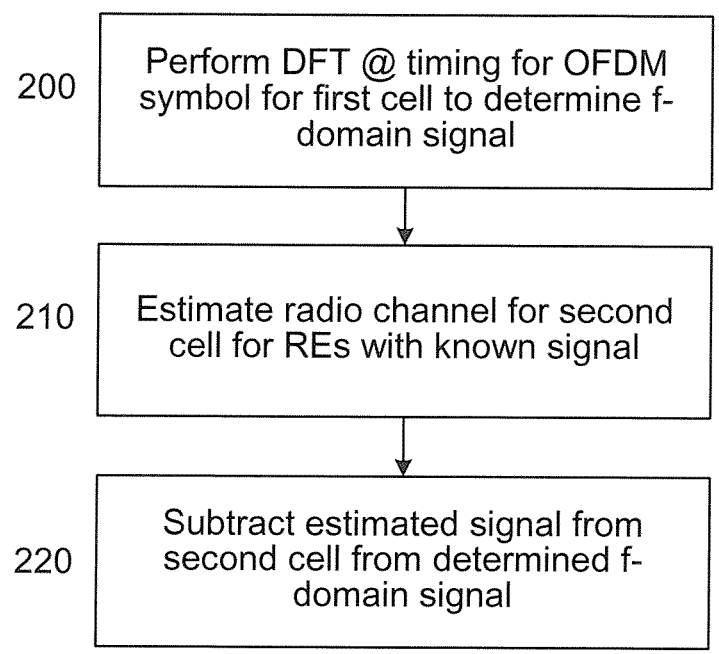
FIG. 7 is a schematic flow chart of another embodiment of a method of the present disclosure.

FIG. 7 is a schematic flow chart of another embodiment of a method of the present disclosure, for instance suitable to use for IC in the first set of OFDM symbols discussed in respect of FIG. 6. In the embodiment of FIG. 7, the OFDM symbols for the first 15 and second 14 cell are time-aligned, in a way that performing and DFT with window for a first OFDM symbol from the first cell 15 also include all information for an OFDM symbol from the second cell 14, hence no ISI or ICI is introduced. The device 11 performs 200 a DFT at a time corresponding to an OFDM symbol of the first cell, and a frequency (f−) domain representation of the OFDM signal is obtained. The radio channel for REs corresponding to known signals transmitted from the second (interfering) cell is estimated 210. The estimated f-domain representation of the signal originating from the second cell is determined (i.e the channel estimate multiplied with the known signal) and subtracted 220 from the first cell RE and an IC RE is determined and used in the further processing, such as decoding of the desired signal from the first cell. This embodiment may be repeated for all REs with a—to the device—known signal transmitted from the second cell.

Figure 8:
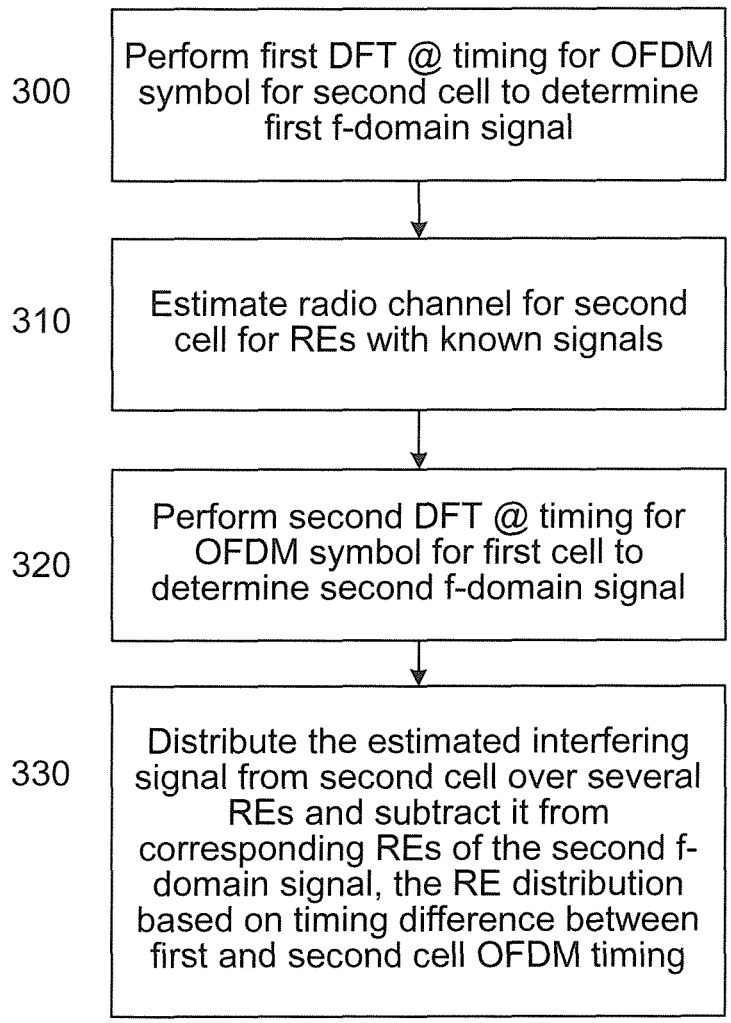
FIG. 8 is a schematic flow chart of another embodiment of a method of the present disclosure.

FIG. 8 is a schematic flow chart of another embodiment of a method of the present disclosure, for instance suitable to use for IC in the second set of OFDM symbols discussed in respect of FIG. 6. In this case the transmitted REs of the first and second cells are not time aligned, hence performing a DFT corresponding to a first cell 15 OFDM symbol introduces ISI/ICI of known signals originating from the second (interfering) cell 14. Hence, as an example, a known signal transmitted from the second cell RBS in a single RE, is distributed over several adjacent REs of the first cell once DFT is performed according to timing of the second cell. In the embodiment of FIG. 8, two DFTs are performed, a first DFT 300 at a time corresponding to an OFDM symbol of the second cell and a second DFT 310 corresponding to an OFDM symbol timing of the first cell. The embodiment is described assuming a known signal is transmitted in a single RE from the second cell, but the method may be used for any known signals in multiple REs as well. Thus, the wireless device performs 300 a first DFT with a timing corresponding to an OFDM symbol from the second cell. A first f-domain representation of the signal is obtained. The radio channel for RE associated with the known transmitted signal from the second cell is estimated 310 (e.g. in the same way as the estimation 210 in respect of FIG. 7). Then the device performs 32*o* a second DFT with a timing corresponding to an OFDM symbol transmitted from the first cell in order to determine a second f-domain signal (e.g. in the same way as the performing 200 an DFT in respect of FIG. 7). Then the device distributes 330 the channel estimate over a set of REs of the first cell, the set corresponding to the REs affected by the non-time aligned DFT processing (as described in conjunction to FIG. 3). Also the known signal is distributed over the affected REs according to the ICI/ISI of the non-time aligned DFT. The distribution is known since the device knows the OFDM symbol timing difference between the first and second cells. Then "the channel multiplied with the known symbol" is subtracted from the set of affected REs and a set of IC REs is determined and used in the further processing (decoding etc.) by the wireless device connected to the first cell. Thus, in the embodiment of FIG. 8, two DFT are performed 300 & 320, after which the interfering signal is subtracted 330 in frequency domain.

Figure 9:
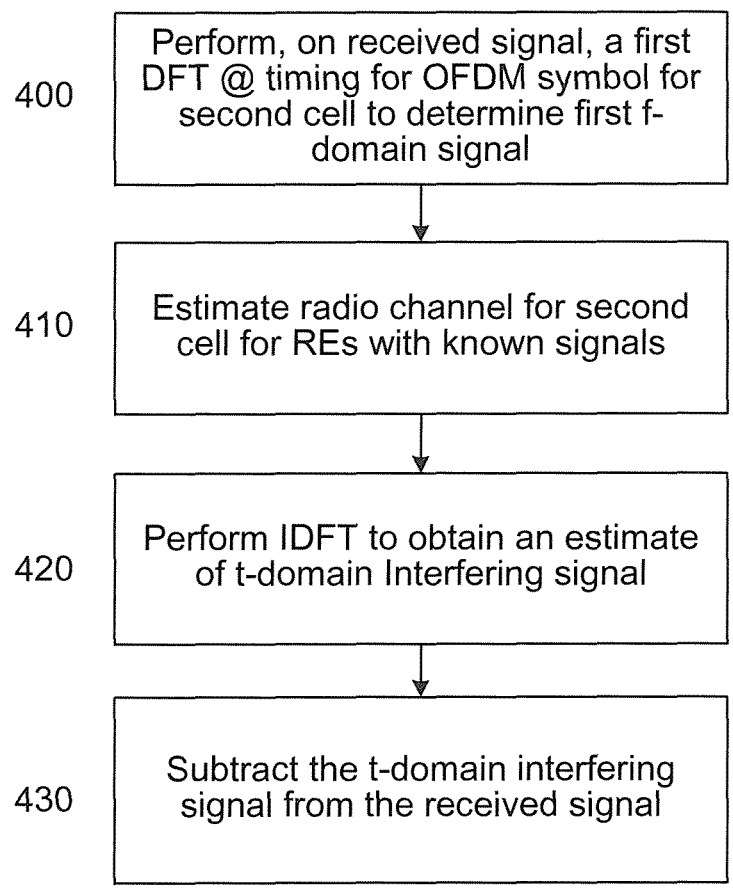
FIG. 9 is a schematic flow chart of another embodiment of a method of the present disclosure.

FIG. 9 is a schematic flow chart of another embodiment of a method of the present disclosure, for instance suitable to use for IC in the second set of OFDM symbols discussed in respect of FIG. 6. In this case the first and second cell are not time aligned, hence performing a DFT corresponding to the first cell 15 OFDM symbol introduces ISI/ICI of known signals originating from the interfering second cell 14. As an example, the interference of a known signal transmitted from the RBS of the second cell in a single RE is distributed over several adjacent REs of a received first cell transmission once DFT is performed according to timing of the second cell. The embodiment of FIG. 9 is described assuming a known signal is transmitted on a single RE from the second cell, but the method embodiment covers known signals on multiple REs as well. The wireless device 11 buffers the received (time (t−) domain) signal in a memory and then performs 400 a first DFT with a timing corresponding to an OFDM symbol from the second cell (e.g. in the same way as the DFT is performed 300 in respect of FIG. 7). Then, the radio channel for RE associated with the known transmitted signal from the second cell is estimated 10 (e.g. in the same way as the estimation 210 or 310 in respect of FIGS. 7 and 8, respectively, e.g. channel estimates multiplied by pilots). However, once the f-domain signal estimate for the known signal from the second cell is determined, an inverse DFT (IDFT), or an inverse FFT (IFFT), is performed 420 on the f-domain signal representation of the interfering second cell signal, whereby a t-domain representation of the interfering signal is determined. Then, the wireless device subtracts 430 the t-domain signal estimate of the second cell from the received signal in the buffer and a t-domain IC representation of the received signal is obtained. This signal is then used in the further processing (e.g. a DFT may be performed at timing corresponding to an OFDM symbol for first cell and the DFT treated signal is then further processed (decoding etc)). Thus, in the embodiment of FIG. 9, a DFT and an IDFT are performed 400 & 420, after which the interfering signal is subtracted 430 in time domain.

Figure 10:
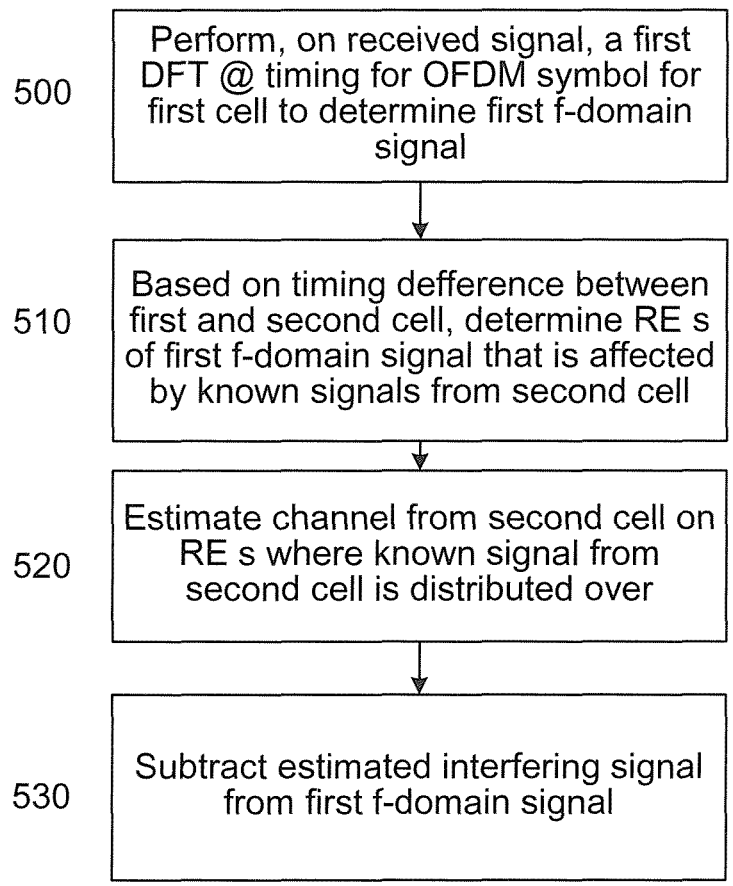
FIG. 10 is a schematic flow chart of another embodiment of a method of the present disclosure.

FIG. 10 is a schematic flow chart of another embodiment of a method of the present disclosure, for instance suitable to use for IC in the second set of OFDM symbols discussed in respect of FIG. 6. In this case, the first and second cells are not time aligned, hence performing a DFT corresponding to the first cell 15 OFDM symbol introduces ISI/ICI of known signals originating from the interfering second cell 14. As an example, interference of a known signal transmitted from the second cell RBS in a single RE is distributed over several adjacent first cell REs once DFT is performed according to timing of the first cell. The embodiment of FIG. 10 is described assuming a known signal is transmitted on a single RE from the second cell RBS, but the method embodiment covers known signals on multiple REs as well. In the embodiment of FIG. 10, a single DFT corresponding to the timing of an OFDM symbol from the first cell is performed 500 (e.g. in the same way as the DFT performed 200 in the embodiment of FIG. 7), and the knowledge of ISI/ICI introduced from known signals from the second cell is taken into account in the IC estimation process. The wireless device 11 thus performs 500 a DFT with a timing corresponding to an OFDM symbol of the first (serving) cell, whereby an f-domain representation of the OFDM signal is obtained. Then, the device, based on the timing difference between the first and second cell, determines 510 a set of REs that are affected by the interfering RE where the known signal from the second cell is transmitted (see FIG. 3 for an example). Also the transformation of the known signal to the different received REs is determined (again possible by knowledge of the timing difference and the DFT processing principles). Then, the channel is estimated 520 on the set of received REs that is affected by the interfering known signal transmitted from the second cell RBS. Further, for each of the REs in the set of affected REs, estimates of the known signal from the second cell are subtracted 530 and an IC set of REs is determined that is then used in the further processing (decoding etc.) of the received signal. According to this embodiment, a single DFT is performed 500 before the interference is subtracted 530. The embodiment may thus require more resources for performing channel estimation 520 than the embodiments of FIGS. 8 and 9, but less resources for performing DFT than said embodiments of FIGS. 6 and 7. The configuration of the wireless device hardware (HW) and software (SW) may thus make the embodiment of FIG. 10 more or less advantageous in comparison with the embodiments of FIGS. 8 and/or 9 depending on the available resources for performing DFT or channel estimation.

Thus, the embodiments of the second IC method (as discussed in respect of FIGS. 5 and 6) presented above with reference to FIGS. 8-10 have different performances e.g. regarding DFT and channel estimation resources needed, and also different costs in terms of computational complexity and delay. An adaption of the above methods is to dynamically make a choice of the method to use (the methods of FIGS. 8-10 being some non-limiting examples of such methods which may be used) based on e.g. available HW or SW resources and e.g. estimated SNR. For example, if the system is operating on a wide bandwidth (10-20 MHz), there may not be processing power to allow for the approaches involving extra DFT or IDFT (i.e. methods according to FIGS. 8 and 9), but with a scenario with narrow bandwidth (up to e.g. 5 MHz), the solutions according to FIGS. 8 and 9 may more advantageously be chosen. Additionally or alternatively, the timing (displacement, misalignment) of the interfering symbols compared with the symbols of the serving cell may be used for choosing the more preferable method. Similarly, depending on the SNR level, the more advantageous IC method varies.

Figure 11:
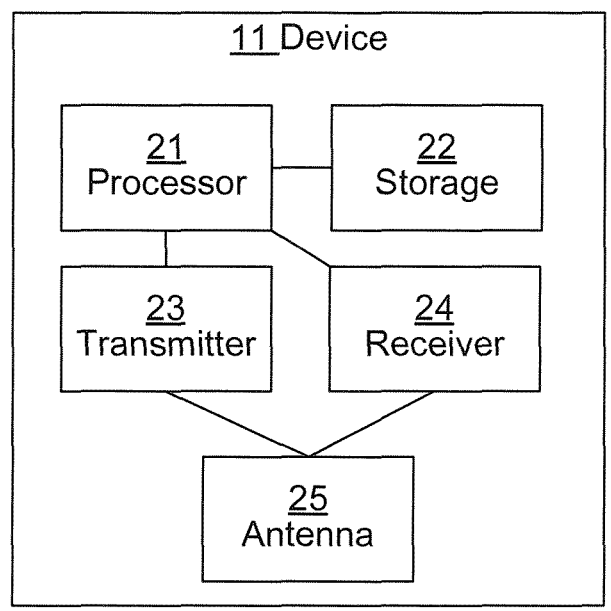
FIG. 11 is a schematic block diagram of an embodiment of a wireless device of the present disclosure.

FIG. 11 schematically illustrates an embodiment of a wireless device 11 of the present disclosure. The wireless device 11 may be any device, mobile or stationary, enabled to communicate over the radio cannel in the communications network 10, for instance but not limited to e.g. mobile phone, smart phone, modem, sensors, meters, vehicles, household appliances, medical appliances, media players, cameras, or any type of consumer electronic, for instance but not limited to television, radio, lighting arrangements, tablet computer, laptop, or PC. The wireless device 11 comprises a processor or central processing unit (CPU) 21 comprising processor circuitry. The processor 21 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 21 is configured to run one or several computer program(s) or software stored in a storage unit or memory 22. The storage unit 22 is regarded as a computer readable means and may e.g. be in the form of a Random Access Memory (RAM), a Flash memory or other solid state memory, or a hard disk. The processor 21 is also configured to store data in the storage unit 22, as needed. The wireless device 11 also comprises a transmitter 23 which comprises transmitter circuitry, a receiver 24 which comprises receiver circuitry and an antenna 25, which may be combined to form a transceiver or be present as distinct units within the wireless device 11. The transmitter 23 is configured to cooperate with the processor 21 to transform data bits to be transmitted over a radio interface to a suitable radio signal in accordance with the radio access technology (RAT) used by the radio access network (RAN) via which the data bits are to be transmitted. The receiver 24 is configured to cooperate with the processor 21 to transform a received radio signal to transmitted data bits. The antenna unit 25 may comprise a single antenna or a plurality of antennas, e.g. for different frequencies and/or for MIMO (Multiple Input Multiple Output) communication. The antenna 25 is used by the transmitter 23 and the receiver 24 for transmitting and receiving, respectively, radio signals.

Figure 12:
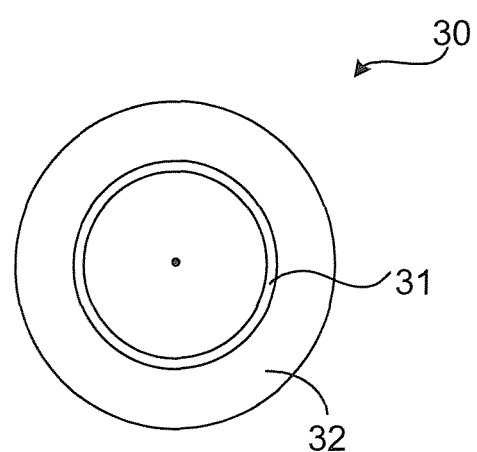
FIG. 12 is a schematic illustration of an embodiment of a computer program product of the present disclosure.

FIG. 12 schematically illustrates a computer program product 30 of the present disclosure. The computer program product 30 comprises a computer readable medium 32 comprising a computer program 31 in the form of computer-executable components. The computer program/computer-executable components 31 may be configured to cause a wireless device 11 discussed herein to perform an embodiment of a method of the present disclosure. The computer program/computer-executable components 31 may be run on the processing unit 21 of the device 11 for causing the device to perform the method. The computer program product 30 may e.g. be comprised in a storage unit or memory 22 comprised in the device 11 and associated with the processing unit 21. Alternatively, the computer program product 3o may be, or be part of, a separate, e.g. mobile, storage means, such as a computer readable disc, e.g. CD or DVD or hard disc/drive, or a solid state storage medium, e.g. a RAM or Flash memory.

The present disclosure also relates to a computer program 31, e.g. a computer program of the computer program product 30 discussed above, the computer program comprising computer program code which is able to, when run on a processor 21 of a wireless device 11 discussed herein, cause the device to perform an embodiment of a method of the present disclosure.

Figure 13:
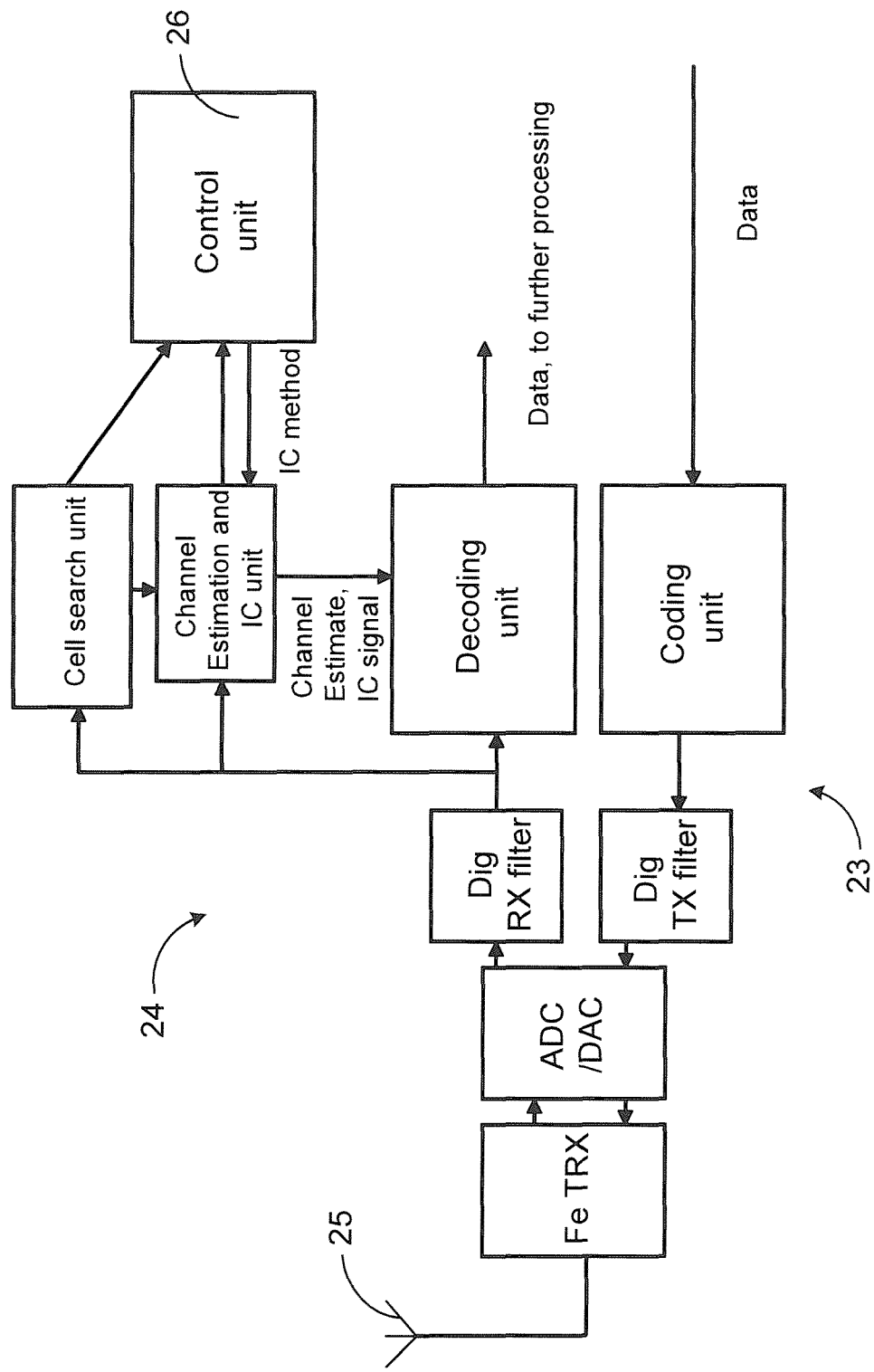
FIG. 13 is a schematic block diagram of an embodiment of a wireless device of the present disclosure.

FIG. 13 is a schematic block diagram of an embodiment of a wireless device 11 of the present disclosure. The device may be configured for performing any embodiment of a method of the present disclosure. The device includes an antenna unit 25, a front end transceiver unit (Fe TRX), downlink radio receiver 24 (RX) and uplink radio transmitter 23 (TX) converting the signal to radio carrier frequency and a digital to analog and analog to digital unit (DAC/ADC) responsible for converting the signal from analog to digital baseband signal (for the RX) and vice versa (for the TX). It furthermore includes digital RX and TX filter in order to process the digital signal to desired form. The receiver 24 furthermore includes a cell search unit responsible for detecting new cells (network (NW) nodes) as well as keeping synchronization with the NW nodes i.e. the timing of respective cell (pico/first/serving cell and macro/second/neighboring/interfering cell). The receiver 24 also includes a channel estimation and interference cancelling (IC) unit, for estimating the radio channel for the first and second cells and also removing the interference originating from the second cell. Information from these two units may be fed to a control unit 26 determining which IC method to use, the control unit 26 being part of, using or otherwise being associated with the processor 21 such that the functionality of the control unit 26 may be implemented in the processor 21. The wireless device also includes a decoding unit for decoding data. Note that this is just an example embodiment, and the device may include more units not described in FIG. 13, see e.g. discussion above regarding a UE. Furthermore, the TRX part may be divided in an RX and a TX part, and the ADC/DAC may be different units ADC and DAC. In some wireless devices, all the units of RX, TX and ADC/DAC may be in a "single chip". The same can be the case for the channel estimation and coding/decoding units. These might alternatively be included in the same chip as the TRX and ADC/DAC or in separate chips.

Below follow some other aspects and embodiments of the present disclosure.

According to an aspect of the present disclosure, there is provided a method of a wireless device for interference cancellation (IC) in a cellular radio network system comprising a serving network node, an interfering network node and said wireless device served by said first network node. The method comprises using a first IC method for at least partly removing an interfering radio signal sent by the interfering network node, from at least a first symbol of a time slot and received from the serving network node. The method also comprises using a second IC method, different from the first IC method, for at least partly removing the interfering radio signal sent by the interfering network node, from at least a second symbol of said time slot and received from the serving network node. By using different IC methods for different symbols, the interference cancellation may be better adapted for the different interferences the different symbols are subjected to.

In some embodiments, the interfering signal is known by the wireless device, facilitating its removal.

In some embodiments, the first symbol is a symbol which is interfered by an interfering symbol of the interfering signal which is time aligned with said first symbol such that the whole interfering symbol information is within a discrete Fourier transform (DFT) window (possibly in view of a CP of the interfering symbol) used by the wireless device for said first symbol from the serving network node.

In some embodiments, the second symbol is a symbol which is interfered by an interfering symbol of the interfering signal which is not time aligned with said first symbol such that the only a part of the interfering symbol information is within a DFT window used by the wireless device for said first symbol from the serving network node.

According to an aspect of the present disclosure, there is provided a method of a wireless device for interference cancellation (IC) in a cellular radio network system comprising a serving network node, an interfering network node and said wireless device served by said first network node. The method comprises receiving a serving signal comprising serving symbols from the serving network node, which serving signal is at least partly interfered by a known interfering signal comprising interfering symbols from the interfering network node. The interfering symbols are not time aligned with the serving symbols whereby only a part of an interfering symbol is within a time window comprising a single serving symbol. The method further comprises performing a DFT operation on a time window of the received serving signal. The method further comprises estimating the interfering signal within said time window. The method further comprises subtracting the estimated interfering signal from the serving signal within said time window.

In some embodiments, the DFT operation is performed on a time window corresponding to a single interfering symbol. Such method embodiments may also comprise performing a second DFT operation on a time window of the received serving signal corresponding to a single serving symbol, to obtain a serving frequency domain signal. The subtracting may then comprise subtracting the estimated interfering signal from the serving frequency domain signal in frequency domain.

In some embodiments, the DFT operation is performed on a time window corresponding to a single interfering symbol. Such method embodiments may also comprise performing an inverse DFT (IDFT) operation on the estimated interfering signal in frequency domain to obtain the estimated interfering signal in time domain. The subtracting of the estimated interfering signal may then comprise subtracting the estimated interfering signal from the received serving signal in time domain.

In some embodiments, the DFT operation is performed on a time window corresponding to a single serving symbol, to obtain a serving frequency domain signal. In such method embodiments the estimating of the interfering signal may comprise estimating the interfering signal based on how the interfering symbols of the known interfering signal are not time aligned with serving symbols (e.g. based on the relative time difference between interfering symbol and serving symbol), and thus also estimating how the interfering signal affect the single serving symbol in frequency domain after the DFT operation. The subtracting may then comprise subtracting the estimated interfering signal from the serving frequency domain signal in frequency domain.

According to an aspect of the present disclosure, there is provided a wireless device comprising a processor and a memory storing instructions that, when executed by the processor, cause the device to perform any embodiment of a method of the present disclosure.

The invention has mainly been described above with reference to a few embodiments. However, as is readily appreciated by a person skilled in the art, other embodiments than the ones disclosed above are equally possible within the scope of the present disclosure.

The invention claimed is:

1. A method in a wireless device for interference cancellation (IC) in a cellular radio network system comprising a serving network node serving said wireless device, the method comprising:

determining whether an interfering symbol of an interfering radio signal present in a time slot of a signal received from the serving network node is a time aligned symbol or whether the interfering symbol is a non-time aligned symbol;

when the interfering symbol is the time aligned symbol, using a first IC method for at least partly removing the time aligned symbol from at least a first symbol in the time slot of the signal received from the serving network node; and when the interfering symbol is the non-time aligned symbol, using a second IC method, different from the first IC method, for at least partly removing the non-time aligned symbol from at least the first symbol in the time slot of the signal received from the serving network node, wherein the second IC method comprises estimating a portion of the interfering radio signal that is present in the time slot using an estimation method that utilizes information about slot timing in the interfering radio signal; and subtracting the estimated portion of the interfering radio signal from the received signal.

2. The method of claim 1, wherein the first symbol received from the serving network node, as well as the time aligned and non-time aligned symbols of the interfering radio signal, are Orthogonal Frequency Division Multiplexing (OFDM) symbols.

3. The method of claim 1, wherein the interfering radio signal of the time aligned symbol and the interfering signal of the non-time aligned signal are known by the wireless device.

4. The method of claim 3, wherein at least one of the interfering radio signal of the time aligned symbol and the interfering signal of the non-time aligned symbol is a Common Reference Signal (CRS), a pilot signal or a synchronization signal.

5. The method of claim 1, wherein the interfering radio signal of the non-time aligned symbol comprises a cyclic prefix (CP) which has a length that is different from a length of a CP used in the time slot of the first symbol received from the serving network node.

6. The method of claim 1, wherein the first IC method, for the time aligned symbol, comprises:
performing a discrete Fourier transform (DFT) operation on a time window of the time slot, the time window corresponding to said at least the first symbol;
estimating the interfering signal within said time window; and
subtracting the estimated interfering signal from said at least the first symbol within said time window.

7. The method of claim 1, wherein the second IC method, for the non-time aligned symbol, comprises:
performing a first DFT operation on a first time window of the time slot, the first time window corresponding to said non-time aligned symbol of the interfering signal, whereby a frequency domain representation of the interfering signal in the first time window is obtained;
estimating the interfering signal within said first time window;
performing a second DFT operation on a second time window of the time slot, the second time window corresponding to said at least the first symbol, whereby a frequency domain representation of said at least the first symbol in the second time window is obtained;
distributing the estimated interfering signal over the frequency domain representation of said at least the first symbol; and
subtracting the estimated interfering signal from said at least the first symbol in frequency domain.

8. The method of claim 1, wherein the second IC method, for the non-time aligned symbol, comprises:
performing a first DFT operation on a time window of the time slot, the time window corresponding to said non-time aligned symbol of the interfering signal, whereby a frequency domain representation of the interfering signal in the time window is obtained;
estimating a channel for the interfering signal in a frequency domain representation within said time window;
performing an inverse DFT (IDFT) on the frequency domain representation of the interfering signal, whereby a time domain representation of the interfering signal in the time window is obtained; and
subtracting the estimated interfering signal from said at least the first symbol in time domain.

9. The method of claim 1, wherein the second IC method, for the non-time aligned symbol, comprises:
performing a DFT operation on a time window of the time slot, the time window corresponding to said at least the first symbol, whereby a frequency domain representation of said at least the first symbol in the time window is obtained;
determining said at least the first symbol which are affected by the interfering signal of the non-aligned symbol;
estimating the interfering signal in frequency domain based on a known difference in timing between the non-aligned symbol and the at least the first symbol; and
subtracting the estimated interfering signal from said at least the first symbol in frequency domain.

10. The method of claim 1, further comprising:
choosing one or both of the first IC method and the second IC method from a plurality of different methods based on one or both of hardware and software resources available for IC in the wireless device.

11. A wireless device comprising:
processor circuitry; and
radio receiver circuitry;
wherein the processor circuitry is configured for, in cooperation with the receiver circuitry:
determining whether an interfering symbol of an interfering radio signal present in a time slot of a signal received from a serving network node is a time aligned symbol or whether the interfering symbol is a non-time aligned symbol;
when the interfering symbol is the time aligned symbol, using a first IC method for at least partly removing the time aligned symbol from at least a first symbol in the time slot of the signal received from the serving network node; and
when the interfering symbol is the non-time aligned symbol, using a second IC method, different from the first IC method, for at least partly removing the non-time aligned symbol from at least the first symbol in the time slot of the signal received from the serving network node,
wherein the second IC method comprises estimating a portion of the interfering radio signal that is present in the time slot using an estimation method that utilizes information about slot timing in the interfering radio signal; and
subtracting the estimated portion of the interfering radio signal from the received signal.

12. The wireless device of claim 11, wherein the processor circuitry is configured for, when using the first IC method, in cooperation with the receiver circuitry:
performing a discrete Fourier transform (DFT) operation on a time window of the time slot, the time window corresponding to said at least the first symbol;
estimating the interfering signal within said time window; and
subtracting the estimated interfering signal from said at least the first symbol within said time window.

13. The wireless device of claim 11, wherein the processor circuitry is configured for, when using the second IC method, in cooperation with the receiver circuitry:
performing a first DFT operation on a first time window of the time slot, the first time window corresponding to said non-time aligned symbol of the interfering signal, whereby a frequency domain representation of the interfering signal in the first time window is obtained;
estimating the interfering signal within said first time window;

performing a second DFT operation on a second time window of the time slot, the second time window corresponding to said at least the first symbol, whereby a frequency domain representation of said at least a second symbol in the second time window is obtained;

distributing the estimated interfering signal over the frequency domain representation of said at least the first symbol; and subtracting the estimated interfering signal from said at least the first symbol in frequency domain.

14. The wireless device of claim 11, wherein the processor circuitry is configured for, when using the second IC method, in cooperation with the receiver circuitry:

performing a first DFT operation on a time window of the time slot, the time window corresponding to said non-time aligned symbol of the interfering signal, whereby a frequency domain representation of the interfering signal in the time window is obtained;

estimating a channel for the interfering signal in a frequency domain representation within said time window;

performing an inverse DFT (IDFT) on the frequency domain representation of the interfering signal, whereby a time domain representation of the interfering signal in the time window is obtained; and subtracting the estimated interfering signal from said at least the first symbol in time domain.

15. The wireless device of claim 11, wherein the processor circuitry is configured for, when using the second IC method, in cooperation with the receiver circuitry:

performing a DFT operation on a time window of the time slot, the time window corresponding to said at least the first symbol, whereby a frequency domain representation of said at least the first symbol in the time window is obtained;

determining said at least the first symbol which are affected by the interfering signal of the non-aligned symbol;

estimating the interfering signal in frequency domain based on a known difference in timing between the non-aligned symbol and the at least the first symbol; and subtracting the estimated interfering signal from said at least the first symbol in frequency domain.

16. A wireless device comprising:

a processor; and a memory storing instructions that, when executed by the processor, cause the device to:

determine whether an interfering symbol of an interfering radio signal present in a time slot of a signal received from a serving network node is a time aligned symbol or whether the interfering symbol is a non-time aligned symbol;

when the interfering symbol is the time aligned symbol, use a first IC method for at least partly removing the time aligned symbol from at least a first symbol in the time slot of the signal received from the serving network node; and when the interfering symbol is the non-time aligned symbol, use a second IC method, different from the first IC method, for at least partly removing the non-time aligned symbol from at least the first symbol in the time slot of the signal received from the serving network node, wherein the second IC method comprises estimating a portion of the interfering radio signal that is present in the time slot using an estimation method that utilizes information about slot timing in the interfering radio signal; and subtracting the estimated portion of the interfering radio signal from the received signal.

17. A wireless device comprising:

a controller configured to cause the wireless device to:

determine whether an interfering symbol of an interfering radio signal present in a time slot of a signal received from a serving network node is a time aligned symbol or whether the interfering symbol is a non-time aligned symbol;

when the interfering symbol is the time aligned symbol, use a first IC method for at least partly removing the time aligned symbol from at least a first symbol in the time slot of the signal received from the serving network node; and when the interfering symbol is the non-time aligned symbol, use a second IC method, different from the first IC method, for at least partly removing the non-time aligned symbol from at least the first symbol in the time slot of the signal received from the serving network node, wherein the second IC method comprises estimating a portion of the interfering radio signal that is present in the time slot using an estimation method that utilizes information about slot timing in the interfering radio signal; and subtracting the estimated portion of the interfering radio signal from the received signal.

18. A non-transitory computer readable storage medium comprising a computer program for interference cancellation, IC, in a cellular radio network system comprising a serving network node serving a wireless device, the computer program comprising computer program code which is able to, when run on a processor of the wireless device, cause the wireless device to:

determine whether an interfering symbol of an interfering radio signal present in a time slot of a signal received from the serving network node is a time aligned symbol or whether the interfering symbol is a non-time aligned symbol;

when the interfering symbol is the time aligned symbol, use a first IC method for at least partly removing the time aligned symbol from at least a first symbol in the time slot of the signal received from the serving network node; and when the interfering symbol is the non-time aligned symbol, use a second IC method, different from the first IC method, for at least partly removing the non-time aligned symbol from at least the first symbol in the time slot of the signal received from the serving network node, wherein the second IC method comprises estimating a portion of the interfering radio signal that is present in the time slot using an estimation method that utilizes information about slot timing in the interfering radio signal; and subtracting the estimated portion of the interfering radio signal from the received signal.

* * * * *